UNITED STATES PATENT OFFICE.

PETER COOPER TIEMANN, OF NEW YORK, N. Y.

IMPROVEMENT IN THE PRESERVATION OF PULP, PASTE, OR SLIP PIGMENTS.

Specification forming part of Letters Patent No. 143,106, dated September 23, 1873; application filed September 6, 1873.

*To all whom it may concern:*

Be it known that I, PETER COOPER TIEMANN, of the city, county, and State of New York, have invented a new and useful Improvement in the Preservation of Pulp, Paste, or Slip Pigments, of which the following is a specification:

This improvement relates to what are known in the trade as pulp, or slip, or paste colors or pigments, including whites, or that class of paint or coloring materials that is prepared for use by precipitation in water, or by fine grinding in water. Most of the above pigments are prepared by precipitation in water, but some are ground in water, and the processes, when properly conducted, yield pigments of the exact consistency required for the best practical use. When, from any cause, the prepared pigment is subsequently reduced in consistency by loss of water, the value of the pigment for practical use is diminished, because it is practically impossible by the readmixture or addition of water to restore the pigment to its normal consistency and original practical value. Attempts have been made to prevent any loss in the consistency of the pigments by storing them in metallic vessels, made perfectly tight; but this has been found impracticable, because of the exceedingly peculiar and delicate character of many of the pigments, which are injured and spoiled by contact with the ordinary metals of commerce. The use of metallic vessels has, therefore, been abandoned in the trade, and resort is still had to the best kinds of wooden vessels for the preservation of the pigments. These wooden vessels answer the purpose very well, and are unobjectionable when the pigments are to be immediately used; but when it is desirable to preserve the pigments for any considerable time in these vessels it is found that the pigments lose their consistency and greatly deteriorate in value. This is supposed to be due to the oozing away of water through the pores of the containing-vessel. Serious losses constantly occur in the trade from this cause, and, until my present invention was made, no means of overcoming the difficulty was known.

My improvement in the preservation of the said pigments consists in treating the wooden vessel, in which the pigments are to be stored, with a material or filling that shall so close the pores of the vessel as to prevent any oozing away of the contents or loss of consistency in the pigments. This may be accomplished by lining or covering the interior of the vessel with a suitable insoluble paint or varnish, such as paraffine, shellac, wax, or ordinary oil-paint or other insoluble material; but on account of the extreme delicacy of many of the pigments, and their liability to injury, if brought in contact with other preparations, I prefer to apply the preservative material upon the exterior of the vessel, and, in practice, this is found to succeed so perfectly that when any of the said pigments are stored in vessels to which the said preservative materials have been applied, the said pigments will have their consistency completely preserved for an indefinite length of time, and all deterioration of the quality of the pigments and all losses from the causes I have mentioned will be wholly prevented.

Having thus described my invention, I claim as new and desire to secure by Letters Patent—

The method of preserving pulp or slip pigments, substantially as herein described.

PETER COOPER TIEMANN.

Witnesses:
 T. B. MOSHER,
 ALEX. F. ROBERTS.